United States Patent
McAfee et al.

(10) Patent No.: US 9,361,296 B2
(45) Date of Patent: Jun. 7, 2016

(54) METHOD AND APPARATUS FOR PROCESSING COLLABORATIVE DOCUMENTS

(75) Inventors: Robert K. McAfee, San Jose, CA (US); Vivek Hebbar, Cupertino, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1140 days.

(21) Appl. No.: 12/358,126

(22) Filed: Jan. 22, 2009

(65) Prior Publication Data

US 2014/0032488 A1    Jan. 30, 2014

(51) Int. Cl.
G06F 17/00 (2006.01)
G06F 17/30 (2006.01)
G06Q 10/00 (2012.01)

(52) U.S. Cl.
CPC .... *G06F 17/30011* (2013.01); *G06F 17/30896* (2013.01); *G06Q 10/00* (2013.01)

(58) Field of Classification Search
CPC .............. G06Q 10/10; G06Q 17/30011; G06F 17/30011; G06F 17/3089; G06F 17/2288; G06F 17/30575; G06F 17/30864; G06F 17/30882
USPC ................................................. 707/705, 608
See application file for complete search history.

(56) References Cited

U.S. PATENT DOCUMENTS

| | | | |
|---|---|---|---|
| 5,671,428 A * | 9/1997 | Muranaga et al. | 715/751 |
| 7,328,243 B2 * | 2/2008 | Yeager | H04L 29/06 707/999.008 |
| 7,703,013 B1 | 4/2010 | Bauermeister et al. | |
| 7,769,810 B1 * | 8/2010 | Kaufman | G06F 17/24 709/205 |
| 8,108,464 B1 * | 1/2012 | Rochelle et al. | 709/205 |
| 2002/0087603 A1 | 7/2002 | Bergman et al. | |
| 2004/0085328 A1 | 5/2004 | Maruyama et al. | |
| 2006/0218500 A1 | 9/2006 | Sauve et al. | |
| 2007/0073745 A1 * | 3/2007 | Scott et al. | 707/100 |
| 2008/0005149 A1 | 1/2008 | Mcafee | |
| 2008/0028333 A1 | 1/2008 | Perelman et al. | |
| 2009/0006981 A1 | 1/2009 | Pagan | |
| 2010/0162104 A1 | 6/2010 | Acker et al. | |

OTHER PUBLICATIONS

"U.S. Appl. No. 12/358,129, Non Final Office Action mailed Sep. 12, 2011", 19 pgs.
U.S. Appl. No. 12/358,129, Appeal Brief filed Nov. 13, 2012, 20 pgs.
U.S. Appl. No. 12/358,129, Examiner's Answer mailed Mar. 13, 2013, 11 pgs.

* cited by examiner

*Primary Examiner* — Angelica Ruiz
(74) *Attorney, Agent, or Firm* — Shook Hary & Bacon L.L.P. Intellectual Property Dept.

(57) ABSTRACT

A method and apparatus for processing collaborative documents providing a portable document version which may be processed when not connected to the collaborative document. The collaborative document is accessible to users through a network. Updates to the collaborative document are provided to the portable document, which may be modified to include the updates or replaced with an updated version of the collaborative document.

31 Claims, 13 Drawing Sheets

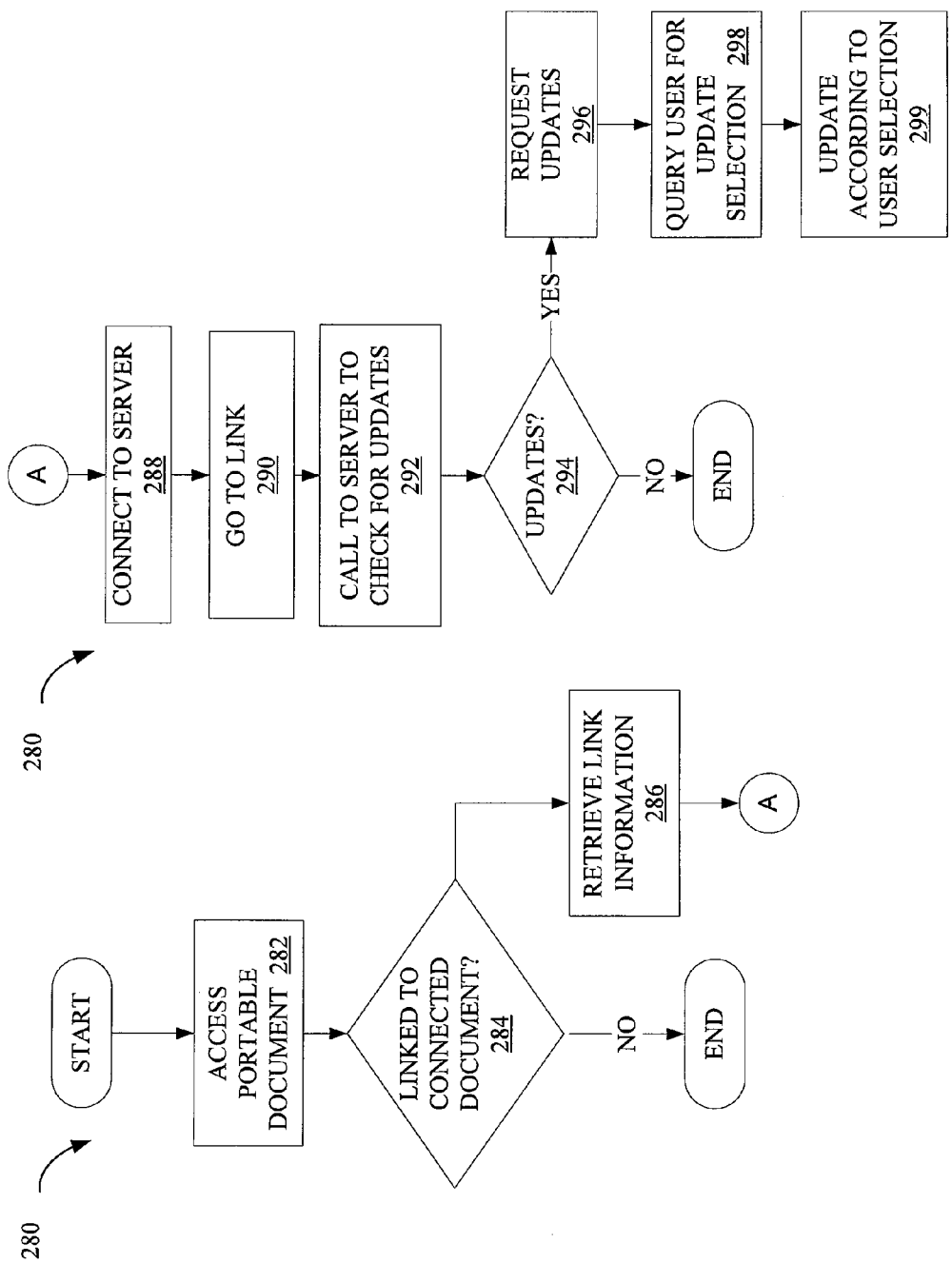

METHOD AND APPARATUS FOR PROCESSING COLLABORATIVE DOCUMENTS

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2008, Adobe Systems Incorporated. All Rights Reserved.

BACKGROUND

On a server-based collaborative word processor a document currently being editing is not stored on a local machine, but rather is stored on a server, such as on a secure server. This allows a user, such as an author or reader, to access the document from any server connection. In this environment, it is often desirable to work on the document off-line; however, this may result in multiple versions of the document.

BRIEF DESCRIPTION OF THE DRAWINGS

Some embodiments are illustrated by way of example and not limitation in the figures of the accompanying drawings in which:

FIGS. 9 and 10 illustrate processes for a document update module for updating a document generated by a collaborative document processing application, according to an example embodiment.

DETAILED DESCRIPTION

Figure 1:
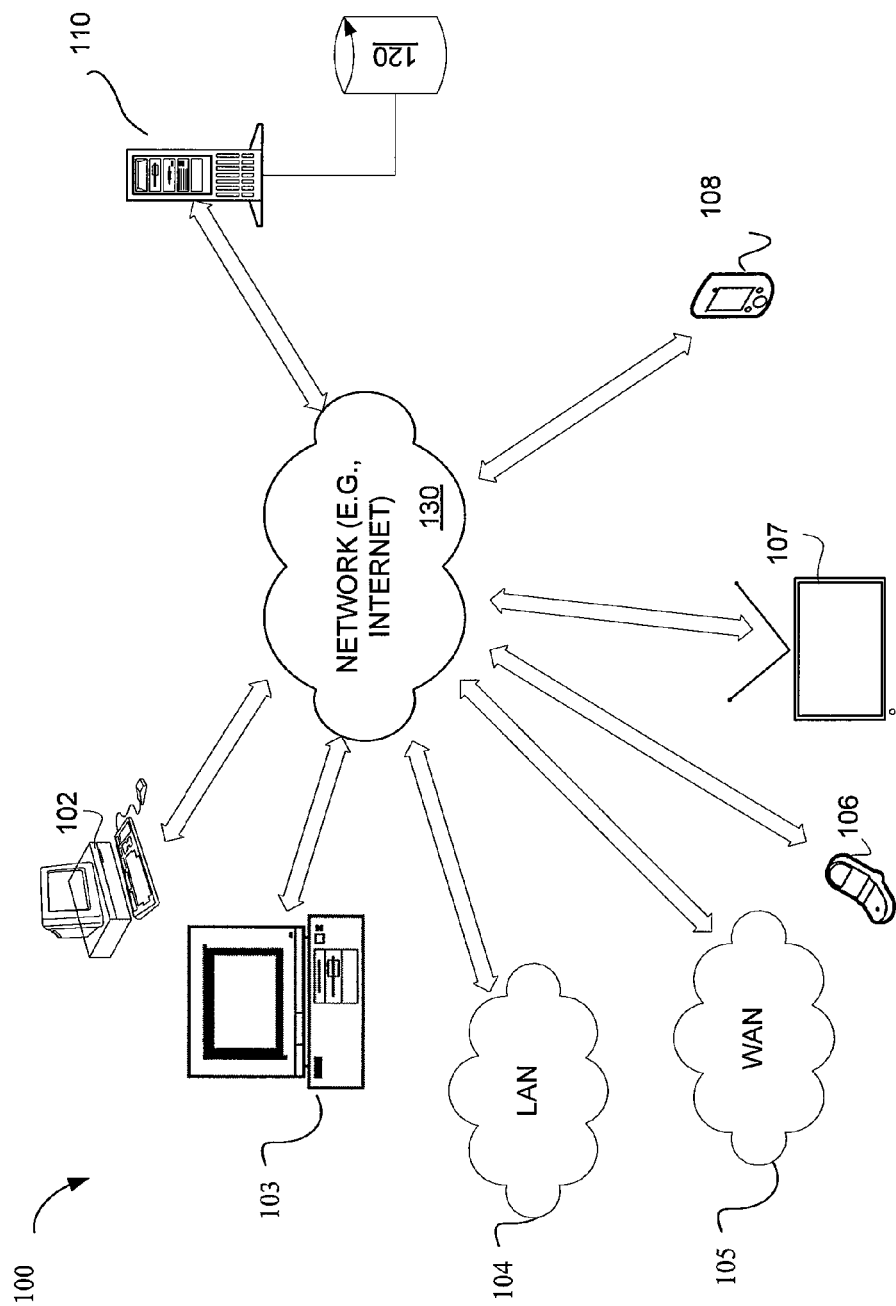
FIG. 1 is a diagram of a network including a collaborative document processing application on a storage device, according to an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

When a collaborative word processor is server-based, the document currently being edited is not stored on a local machine, such as a physical computing device, but rather is stored on another physical computing device, such as a server, which may be secured. This allows a user, such as an author or reader, to access the document from any server connection. A server-based collaborative word processor may make it unnecessary to email files back and forth or to carry them on memory devices in order to have access anywhere. When document content is saved on the server, or some other network device, the document is safe from events on other machines (e.g., client machines), including crashes, viruses, versioning, losing connectivity or navigating away from the page. Note, the collaborative word processor may be implemented in a point-to-point network, wherein one of the distributed devices is used as the central service provider or server.

Example embodiments are described with respect to a web-based example of a collaborative word processor program. The use of a web-based word processor is provided purely as an example to aid in understanding the methods and apparatus taught herein. Such methods and apparatus are also applicable to other collaborative word processors.

In generation of collaborative documents, there is a need to allow off-line individual editing so as to avoid the proliferation of different versions of a collaborative document. In one example a collaborative document processing application is resident on a server or a peered computer system in a peer-to-peer, referred to as P2P, network, accessible by multiple users. For the purposes of explanation, a server-based collaborative environment is described below. However, it will be appreciated that the example embodiment may also be deployed in any network collaborative environment, such as one employing a distributed or P2P architecture.

Each user may open a new document which may be accessed by others. This networked collaborative environment allows real-time collaboration. Multiple users may edit the same text document concurrently, with the ability to view edits and comments as they occur. Multiple versions of the collaborative document, including edits, comments, amendments, and other changes made by the multiple user, are stored on the server. This ensures access to all materials by each user. In one example, the server only stores the current version to avoid any confusion. In another example, the system stores multiple versions of the document to track the changes and edits made. In still another example, the server stores a current version, as well as an amendment file which identifies all changes made to the document. The amendment file may also include a timestamp indicating the time and date of each change, and also identify the user making the change.

In one example embodiment, a user processes a portable document corresponding to a collaborative document. The collaborative document being resident on a server accessible through a distributed network, such as where the collaborative document is stored on a server and distributed through the network. The network may be a local intranet or other network for a group of users, or may be accessible to a wide area network. The portable document is resident on a local machine and is editable when the local machine is disconnected from the network. The local machine may be a personal computer, a portable computing device, or other communication device having access to the network, and operable when disconnected from the network as well. The local machine is adapted to display one of the collaborative document and the portable document, and is further adapted to switch between views of the collaborative document and the portable document. In one embodiment, switching between views is based on a user selection. The user selection may be input through a graphical user interface, wherein the user selects one of the collaborative and portable documents. The display may present both documents concurrently, such as side-by-side, or may layer views, such as to use tabs to identify each document. Still other displays may display one view at a time, wherein the other view is hidden and the user selection is implemented through a menu of options. Alternate user selection techniques may be implemented to switch between views.

In one embodiment a collaborative document word processing system enables and controls access to a collaborative document stored on a network accessible server. A remote user may process or modify the collaborative document via the network, such as the Internet. The system further enables and controls storing a copy of the collaborative document as a portable document on the remote user's local client machine, wherein the portable document includes associated link information identifying a network accessible location of the collaborative document. The user may send a request for a current version of the collaborative document to the server and receive a current version of the collaborative document. The user may then access the collaborative document on the server using the link information and a current version. The system may be embodied in a hardware product or may be computer-readable instructions stored on a memory device.

The collaborative document processing system includes a server component and a client component. The system allows a copy of each collaborative document to be made available to networked machines, such as an individual user's machine, and to be stored on the networked machines. The collaborative document is the document in a first state, referred to as a collaborative state. The copy is portable and may be transmitted from a networked machine or individual client machine without connection to the central server. In this way, the copy is the document in a second state, referred to as a portable state. As illustrated in FIG. 1, a system 100 includes multiple physical computing devices a server 110, which may include multiple servers and may be a distributed network or servers and storage device 120. The server 110 hosts the collaborative document processing application, storing information in storage 120. The server 110 communicates via and is accessible through the network 130, which in one example is the Internet. A variety of devices may provide users access to the server 110, such as computers 102, 103, Local Area Network (LAN) 104, Wireless Area Network (WAN) 105, wireless device 106, cable networked television 107, or Personal Digital Assistant or Smart Phone 108. Other devices may also be used in addition to the illustrated examples. The collaborative document processing application is resident on the server 110 and uses storage device 120 to store the document files, as well as other files associated therewith.

Figure 2:
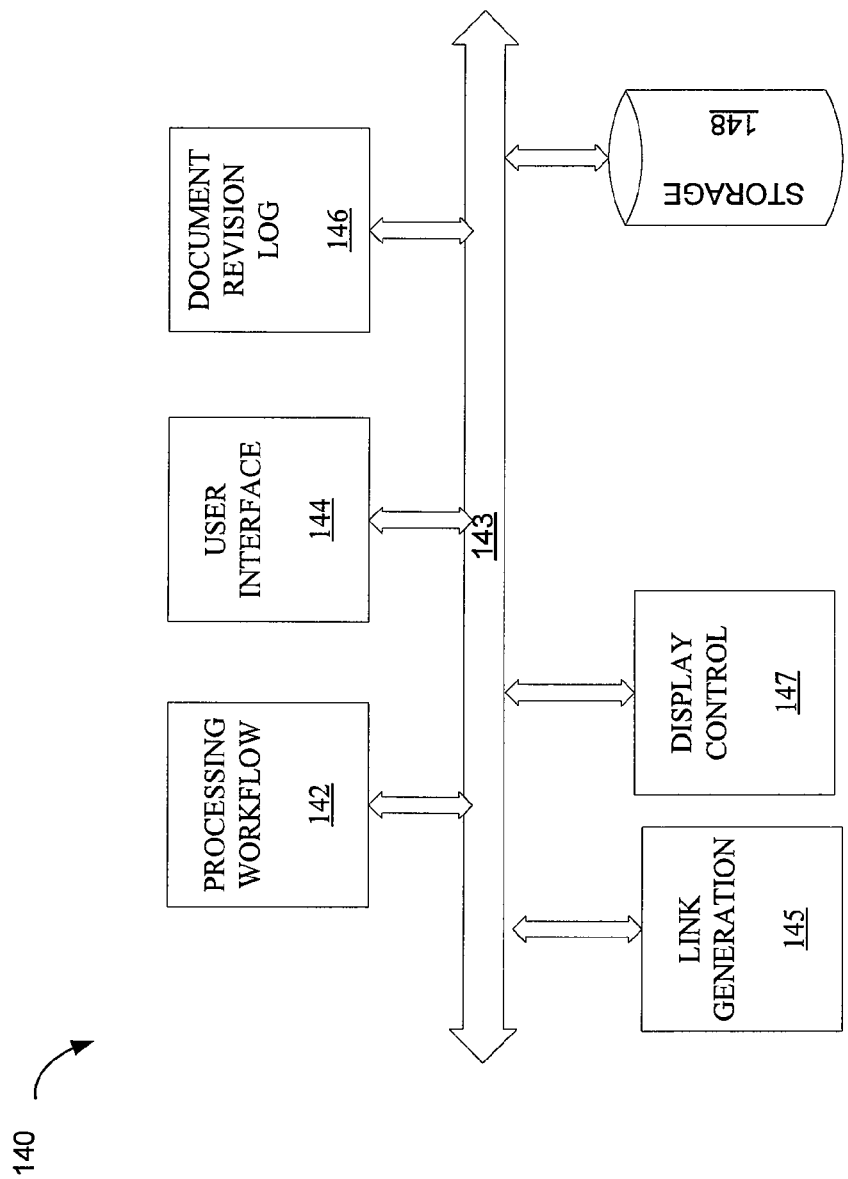
FIG. 2 is a diagram of a collaborative document processing application, according to an example embodiment.

The collaborative document processing system includes application 140 illustrated in FIG. 2. The application 140 includes a user interface 144 to interface with the user device. The user interface 144 receives selections and commands from the user, such as to open a new document, add text, add graphics, incorporate comments, edit an existing document, etc. The user interface 144 then passes these to the processing workflow module 142, where the selections and commands are implemented. A document revision log 146 tracks the current version of the collaborative document and keeps a log of edits made to the collaborative document. The link generation module 145 builds a link into each collaborative document, which becomes a part of the document, as described further with respect to FIG. 10. The link is a unique identifier for a collaborative document that is used to access the document from the network. The link may be a Uniform Resource Locator (URL) address or other indicator that allows the document to be found. The link generation module 145 determines a link for a given collaborative document according to a predetermined format and applies the link to the document. The link generation module 145 is an example of a data dictionary generation module. In this example, the data dictionary is a document dictionary containing a set of information mapping one version of a document to another version, in this case the document dictionary is a set of information mapping a portable document stored at the client machine to the document stored on the server. The portable document may be editable without connection to the server or may be a static document, which is non-editable. The document dictionary may include a document ID, version information, timestamp information, user(s) information, or an encrypted password. The document dictionary information may be used to generate a URL or to communicate to the server using a network protocol In one embodiment, the application 140 is implemented in hardware, having a communication bus 143 allowing each unit within application 140 to interact with each other. Document revision log 146 may be implemented as a memory storage device having a memory controller. Display control 147 may be a circuit or module adapted to provide instructions for display of a collaborative document and a collaborative work environment to a remote user machine. Processing workflow unit 142 may include a processing unit for executing instructions provided therein to implement a collaborative document work processing function. The application 140 may be provided as complete solution, such as part of a system on a chip solution. In alternate embodiments, application 140 may be implemented at least partially in hardware, firmware, software or a combination thereof. The various components of application 140 may be contained within a single computing environment or may be distributed, such as in a networked or clustered environment. Additionally, the functionality of each of the various components, as illustrated, may be distributed, combined or modified to accommodate specific computing environments.

The display control module 147 provides information for displaying the collaborative document on the user machine with the user's application. In one example, the user's application is a web browser, and the collaborative document processing application is web-based; the user accesses the document as a web page wherein the link is the URL of the document. In one embodiment, at the client machine, a desktop application may be used for viewing both the portable view and the online editable view. The document dictionary generation module (e.g., the link generation module 145) may be on the server or the client application, but the document dictionary information is located inside, or otherwise directly associated with, the portable copy of the document on the client's machine.

The server 110 includes a database for storing association information, specifically associating document identifiers with collaborative documents. The document identifier is unique, and may be a unique number, string or other identifier, generated by the application 140 in the server 110. For example, a document having the title "My Summer Vacation" is created by a user of accessing application 140, and the server 110 may choose to assign an identifier of "102" to the document. When a local copy of the document is made for the client machine, such as in a PDF format, the copy contains the server assigned identifier, 102, and a timestamp. The title of the document copy in this case is "My Summer Vacation.pdf." When the user opens the document copy, "My summer vacation.pdf," in a client application, for example in Adobe Reader® software by Adobe Systems Incorporated, San Jose, Calif., the client application sends the identifier and timestamp to the server and asks if there is an update. The server responds with confirmation or acknowledgement when the server, or online, version of the document has a newer timestamp than the timestamp of the copy. An alternative embodiment applies a version number rather than a timestamp for simplified application.

Figure 3:
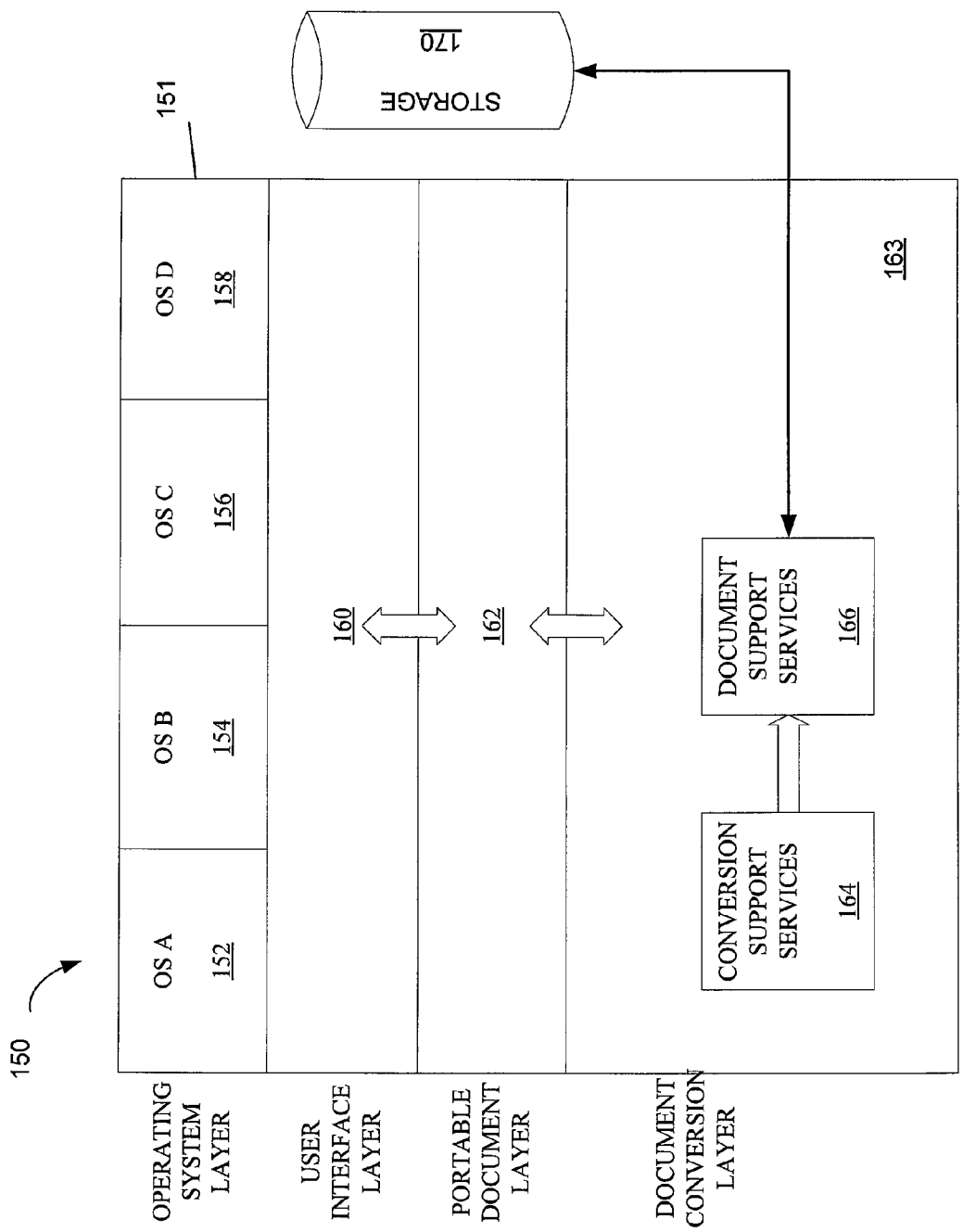
FIG. 3 is an architectural diagram of a collaborative document processing application as in FIG. 2, according to an example embodiment.

The collaborative document is editable by the users through the network. The user accesses the collaborative document resident at server 110 via an application at the user machine. Note, the application may be stored in memory, such as memory storage device. The user application in one example is a web browser, but may be any application capable of networked communication. In one example, a user application 150 has an architecture as illustrated in FIG. 3. Application 150 has four main layers, an operating system layer 151 for interacting with multiple types of operating systems, a user interface layer 160, a portable document layer 162, and a document conversion layer 163. The operating system layer 151 includes specific modules 152, 154, 156, and 158 for interfacing and operating with operating systems A, B, C, and D, respectively. The user interface layer 160 includes the modules used to interact with the user and implement user selections and commands. The user interface layer is discussed in detail with respect to FIG. 4.

The portable document layer 162 is the data layer in the client application for reading the portable document and presenting the data to the user interface layer which presents the view, and in one embodiment also presents the document dictionary information for use by the user interface layer to present the online editable state. The portable document layer 162 is responsible for parsing the document copy at the client machine, such as the PDF file, and composing the elemental constructs like strings, numbers, dates, and dictionaries into higher-level objects like pages, bookmarks, and comments. The user interface layer 160 is then responsible for providing a platform-independent document viewing system, including common user interface elements such as tool buttons, menus, and windows. The platform layer, or operating system layer 151, is responsible for providing a real implementation for the abstract user interface components in the user interface layer. The document conversion layer 163 provides the conversion support services 164 for converting from the server document to a user document, and document support services 166. The document conversion layer provides the user copy of the document to storage 170.

The user application 150 allows the user to interface and uses the server application 140, and thus to access the collaborative document, both for viewing and editing. In alternate examples, the user application may a web application, such as a Flex® application, by Adobe Incorporated, San Jose, Calif., running in a web browser, or an ActiveX® platform by Microsoft Inc., Redmond, Wash., program running in a web browser.

Additionally, the user application 150 provides the user functionality to convert the collaborative document into a portable document at the user machine. While the user is connected to the server 110, the user accesses the collaborative document stored on the server 110. In the present example embodiment, the user application 150 may be an application to create a state portable document, or may be a browser with the additional capability to create an offline portable state, and the collaborative document of the server 110 is in an online state. In other words, the user is online and uses the online document on the server 110. The user may also decide to make a copy of the collaborative document on the server 110 and store the copy on the user machine. Therefore, each collaborative document may have an online or collaborative state and a portable state. The collaborative document in the online state is editable online when the user is connected to the server 110. This is referred to as an online document. The collaborative document in the portable state may be editable, or static (non-editable) when the client's processing device is disconnected from the server 110. This is referred to as a portable document. For example, a client or user may access a collaborative document, modifying and editing the collaborative document on the server 110. The client may desire to use the collaborative document, or portions of the collaborative document in a non-collaborative work. In this case, the user may choose to have a portable document stored on the client's processing device. The portable document may be edited on the client's processing device using a local application. Continuing with this example, the modifications and edits made to the portable document by the client are not intended for the collaborative document, but rather are independent works.

There are a variety of reasons why a user may desire a portable state collaborative document. The ability for a document to have multiple states allows the user much flexibility. Unlike a conventional web page, the collaborative document is portable in the off-line state. In other words, the user may work on a document online while connected to the server 110, download a portable version of the online document, edit the portable document and forward the edited portable document to another recipient without accessing server 110.

The user interface layer 160 also includes a viewing module 172, which provides a format for viewing the document online, while connected to server 110, and for viewing the document on the user machine when off-line, while disconnected from server 110. When the client machine is connected to the server, the client application provides a dual view or a single switchable view based on user preference. When the client machine is disconnected from the server, the display presents the portable view to the user. The user application further includes workflow business logic 174 and document update module 176. The viewing module 172, the workflow business logic 174 and the document update module 176 communicate through a communication bus 178. Alternate examples may include other modules to perform functions specific to the application desired, such as for processing other types of documents, including spreadsheets, computer programming generation, multimedia documents and products, etc.

Figure 4:
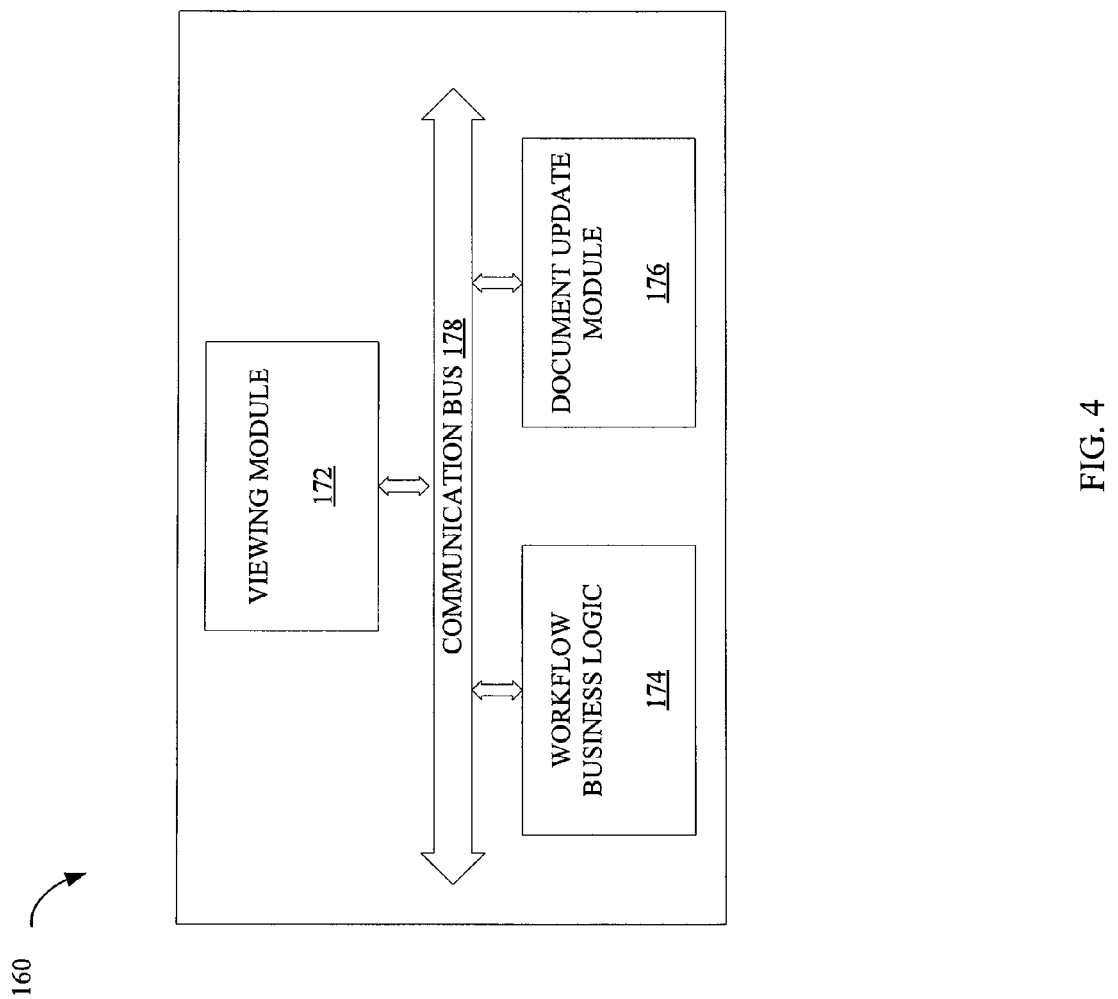
FIG. 4 is a diagram of a system for implementing a user interface layer of a collaborative document processing application as illustrated in FIG. 2, according to an example embodiment.

Continuing with the example of FIG. 4, the workflow business logic 174 is the counterpart to the processing workflow 142 of server application 140, but additionally provides processing functions for off-line processing as well. While online, the workflow business logic 174 uses the functions of the server application 140 where possible and acts as the liaison between the server application 140 and the user. When off-line, the workflow business logic 174 receives user commands and selections and implements the commands and selections directly on the portable document. The server application 140 provides no control over the portable document at the user machine. Rather all editing, commenting, formatting, etc. is performed by the workflow business logic 174 for the portable document. The application 160 further includes document update module 176 which maintains the current version of the portable document. The document update module 176 further synchronizes the portable document to the online collaborative document. An example processing performed by the document update module 176 is illustrated in FIG. 5.

Figure 5:
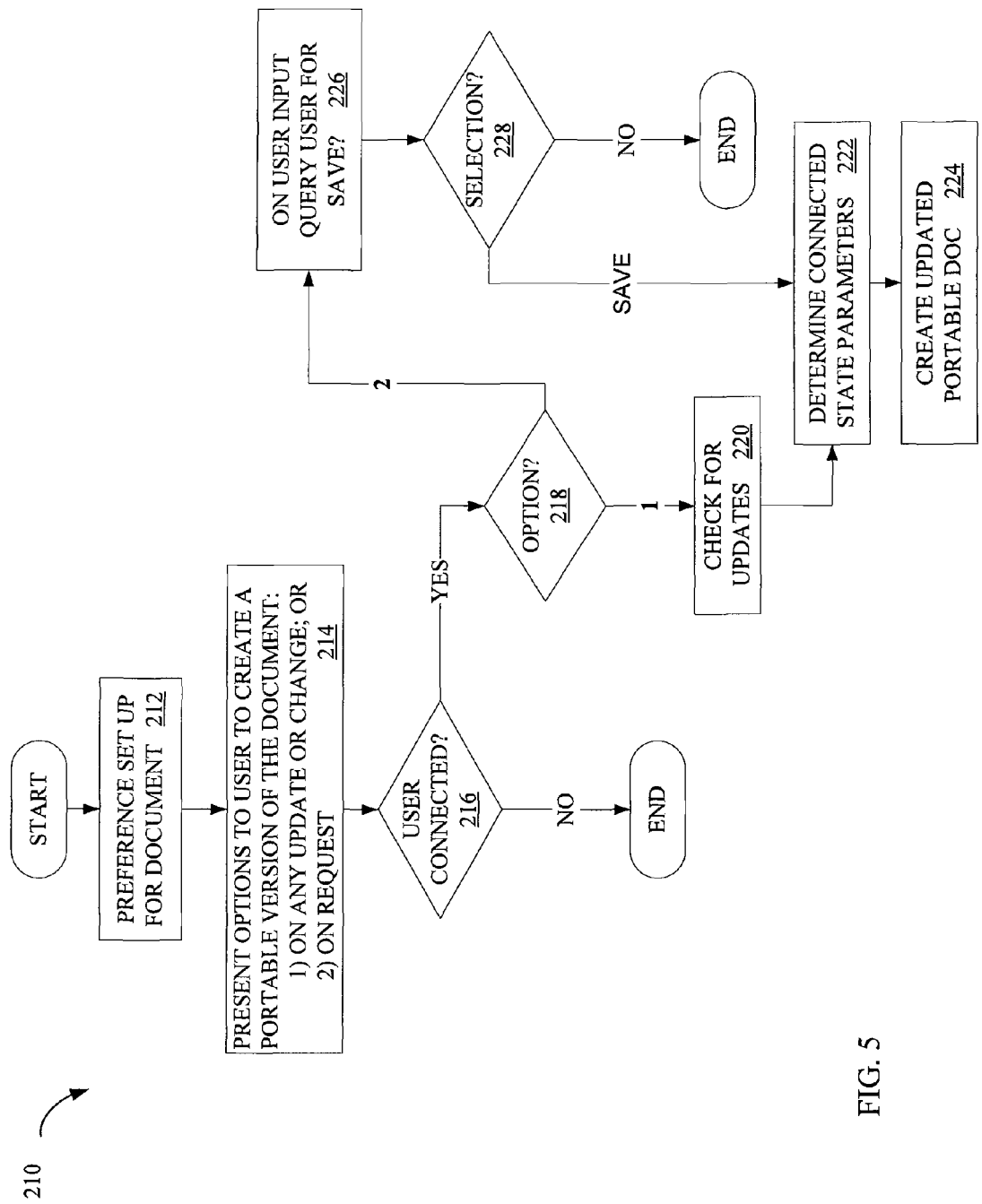
FIG. 5 is a flow diagram illustrating a document update procedure according to a document update module for updating a document generated by a collaborative document processing application, according to an example embodiment.

The update process 210 of FIG. 5 sets up the user preference information for a document, 212. The preferences are received from the user, and may be prompted by the server application 140, the user application 150, on initial access to a document, or by a user-initiated request. Alternate methods may be used to procure the user selections for a given use or application. The user application 150 then presents options to the user for creation of a portable version of the document, 214. The options may be as illustrated in the example of FIG. 5, wherein a portable version of the online document is created: 1) on any update or change to the online document, or 2) on request by the user. Alternate methods, or combinations thereof, may be employed as well. For example, the user may desire to create a portable version of the document periodically, such as daily or hourly. When collaboration on an online document by multiple users is active, daily or periodic updates may reduce the need for the user to evaluate real-time modifications to the collaborative document. Similarly, the user may desire an alert when changes are made to the collaborative online document. This may be the case where the collaborative online document is only infrequently edited.

Continuing with FIG. 5, the user application 150 determines if the user is connected to the server 110 at decision point 216. If the user is not connected the updates are not available. If the user is connected, the user option selected is determined at decision point 218. For option 1, the user application 150 checks for updates, 220, and continues to determine the connected state parameters, 222. In one embodiment the link information or dictionary information is provided as the location identifier, such as the URL for the collaborative document. The link may simply be the URL of the collaborative document, the dictionary information being embedded in the URL. In another embodiment, the dictionary information is provided by the server 110. The user application 150 then creates an updated portable document from the updated or current online document, 224. If, at decision point 218, the option 2 was selected, the user application 150 waits for a user command or input to request creation of a portable document. On user input, the user application 150 queries the user whether to save the online document as a portable document, 226. The selection is determined at decision point 228, and if the user requested to save a portable document, processing continues to determine connected state parameters, 222, and create an updated portable document, 224. The connected state parameters are the parameters and specifics of the online document, or connected state document.

Figure 6:
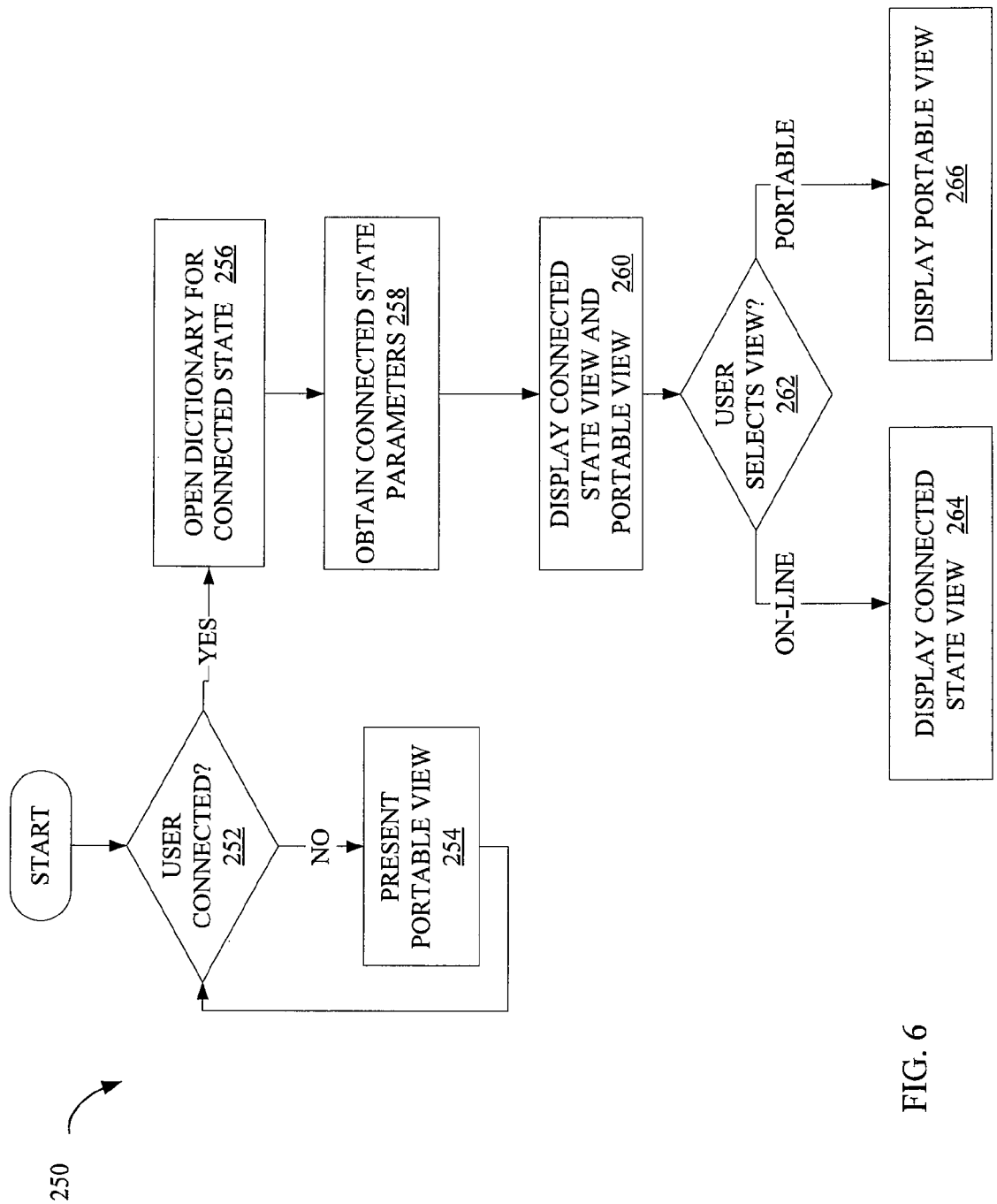
FIG. 6 is a flow diagram illustrating a document viewing procedure according to a document viewing module for presenting views of a document available in multiple states, according to an example embodiment.

As illustrated in FIG. 4, and discussed hereinabove, the user application further includes a viewing module 172, the operation of which is illustrated in FIG. 6. The viewing process 250 determines if the user is connected to the server (i.e., online) or disconnected from the server (i.e., off-line) at decision point 252. If the user is currently disconnected from server 110, off-line, the user application 150 presents the portable view 254 (illustrated in FIG. 7). If the user is connected to server 110, online, the user application 150 opens the dictionary for the connected state, 256, and continues to obtain connected state parameters, 258. Using the state parameters, the user application 150 provides a display for the connected state view, or online view, and the portable view, 260. Note, the same display is used to access both documents. As the portable document is a copy of the online document, it may be convenient to consider the two documents as different versions of the collaborative document. The user is now able to select which version to work view and process, connected state view, 264, or portable view, 266.

Figure 7:
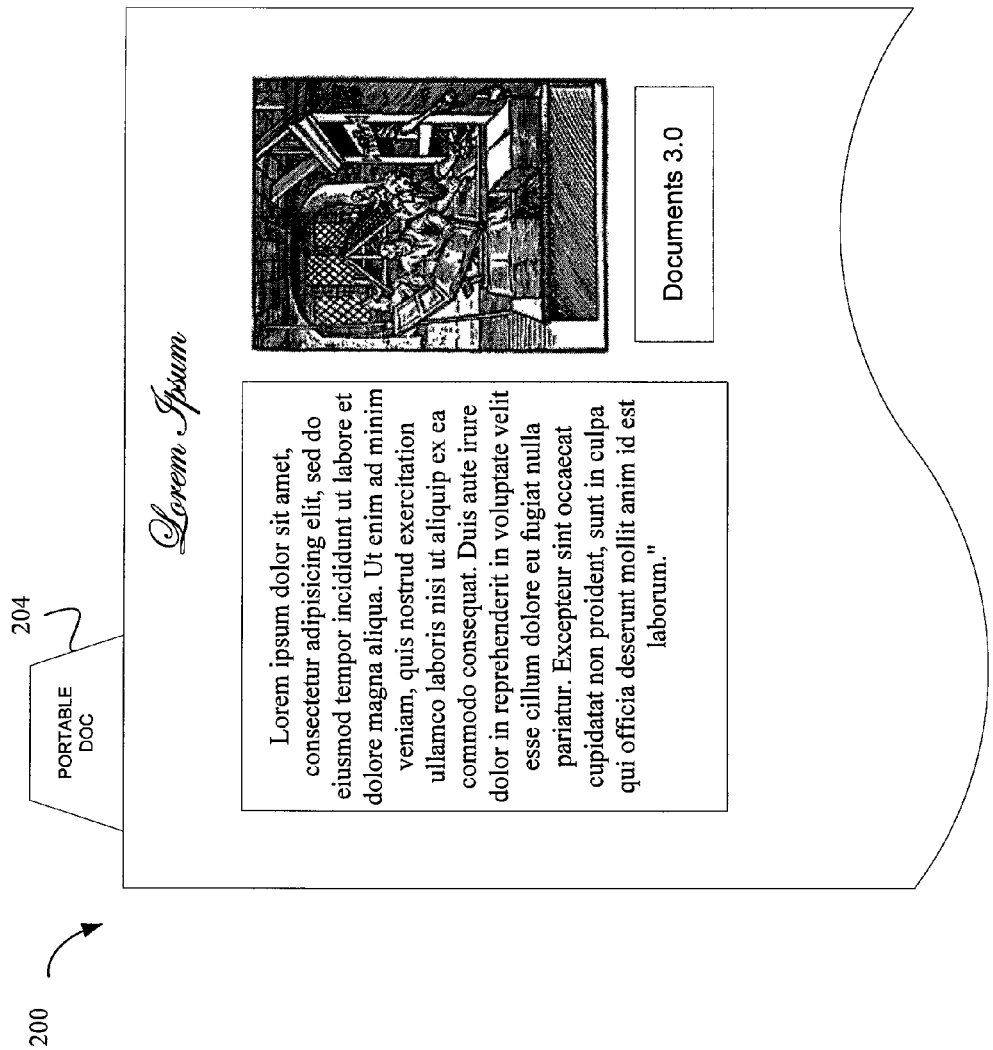
FIG. 7 is a diagram illustrating a user presentation of a document in a first state, the document generated by a collaborative document processing application, according to an example embodiment.

FIG. 7 illustrates a portable document presented to the user as page 200. The user is disconnected from the server 110 and therefore, the portable document is available, but the collaborative or online document is not available. The tab 204 indicates the current document is a portable document. The content of page 200 is presented to the user.

Figure 8:
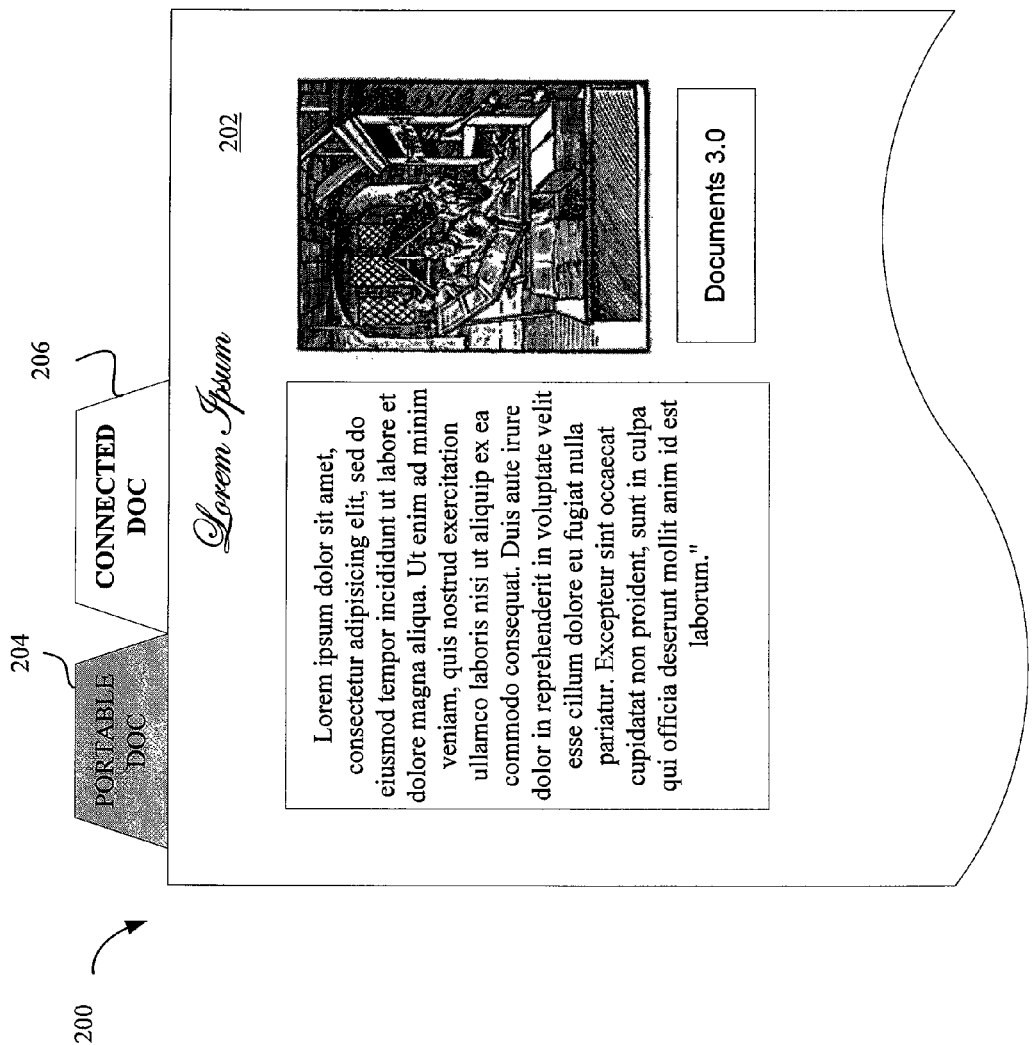
FIG. 8 is a diagram illustrating a user presentation of a document in a second state, the document generated by a collaborative document processing application, according to an example embodiment.

FIG. 8 illustrates the same document when the user is connected to server 110. Here, the connected document tab 206 indicates the online document is the current view. Note, the portable document is also available for view, but is not the current view. The portable document tab 204 is shaded, indicating this view is not active, but is available. In one embodiment, the user may switch to the portable document view by selecting or mouse-clicking the portable document tab 204. Alternate switching mechanisms may be used to change the viewed document. In another example, not shown, the portable tab 204 and the connected tab 206 include document identification information, where multiple documents may be concurrently available for viewing.

FIGS. 9 and 10 illustrate processes which may be used by the document update module 176 of FIG. 4 in updating the portable document from the online document. In a first process 280 the user accesses the portable document, 282, and the user application 150 determines if the portable document has a link to the online or connected document at decision point 284. If there is no link indicated, update processing ends. Where there is a link, as indicated by presence of link or dictionary information, the user application 150 retrieves the link information 286. Processing continues to FIG. 10, and the user application initiates a connection to the server, 288. This may be an automatic attempt to connect to the server 110, or connection time may be at the option of the user. One example queries the user whether to connect to the server. Another example provides an option to wait until the user connects. Once connected to the server, the user application 150 goes to the link location, 290, such as the URL of the collaborative document. The process includes a call to the server to check for updates, 292. If updates are available at decision point 294, the request is made for updates, 296. This may be a request to check the time stamp or other information of the online document. The process then queries the user for an update selection 298, and updates according to user selection, 299. Note the update selection may be preconfigured, and therefore, the user is not queried on each update.

In one example, the updates of the online document are provided to the portable document automatically. The portable document may be replaced with each updated online document. Alternately, each updated online document may be given a version number and stored individually, allowing the user access to the revisions and version history. Another example asks the user whether to replace the current portable document with the updated online document. Still another example provides an alert or message to the user that a new copy or version of the online document is available.

The server 110 may maintain each revision as a revision history document, or as separate documents, each having a unique version number. The user may then request a specific version of the document from the server 110. In one example, a user creates a document titled "My Summer Vacation" on an application running on a document server located at a URL given as http://acrobat.com. The server creates a new entry in its database, for example, including a document ID number, a version of the document, the title, a textual description of the document. The document ID number may be for example ID=200, and the version=1. This information uniquely identifies the document, as no other document may be stored in the database associated with the document server having document ID=200 and version=1. The document ID field and the version field create a unique key in the database. The stored document is a collaborative document. The user then modifies the collaborative document stored on the server using an application resident on the server; and the server creates a new entry in the database, specifying document ID=200, but now version=2, corresponding to the modified version of the collaborative document. The title and textual information are unchanged, while the version changed. The user then creates a portable copy of the document to store on the local machine. The portable copy is created using the server application, wherein the server application creates the portable copy and encodes the document ID and version number into the portable document. Specifically, in this example, the server application would add link information including the document ID=200 and version=2. The user, or another user, may continue to modify the collaborative document, which the server stores in the database as document ID=200 and version=3. When the user opens a portable copy of the document, the viewing application on the client machine, such as Adobe Reader® by Adobe Incorporated, San Jose, Calif., sends the document ID=200 to the server and requests the most recent version number. This may involve accessing a specific URL corresponding to the document, such as http://acrobat.com/CheckVersion?ID=200, or through other signaling mechanisms or protocols. The URL for this request does not change with subsequent versioning of the collaborative document having document ID=200. In this situation, the server would respond indicating the most recent version=3. The client viewing application would compare the response, version=3, with the version field stored in the portable document, version=2, and use this information to determine an update is available.

As the user works with a portable document, the document diverges from the original collaborative document. In this case, the user may desire to merge updates to the online document with the updates made to the portable document, rather than replacing the portable document or maintaining different versions. When possible, the user application 150 may merge the updates from the online document with the portable document. Alternatively, the client application in collaboration with the server application may merge updates to the user's portable document with the online document.

The user application 150 and the server application 140 work with the online document. The user application 150 identifies link information in a portable document to identify the location of the corresponding collaborative online document. In one example, the link identifies the location of the server that keeps track of a collaborative document, wherein the link is given as "http://acrobat.com." The document identifier is a unique number or string on that server. The server is responsible for generating a unique document identifier for each of its collaborative documents. An example of a unique identifier might be a string such as "my summer vacation;" in this example it is advisable that the string is not used by any other document to avoid confusion and contentions. Additional information includes the timestamp or version number, which identifies a version of the collaborative document. It might be an absolute time like "2008-08-28:07:30:21" or it might be a simple version number, e.g. "1" for the first version, "2" for the second, and so on. Given the document identification information, the server can produce the correct version of any of document on the server.

Figure 11:
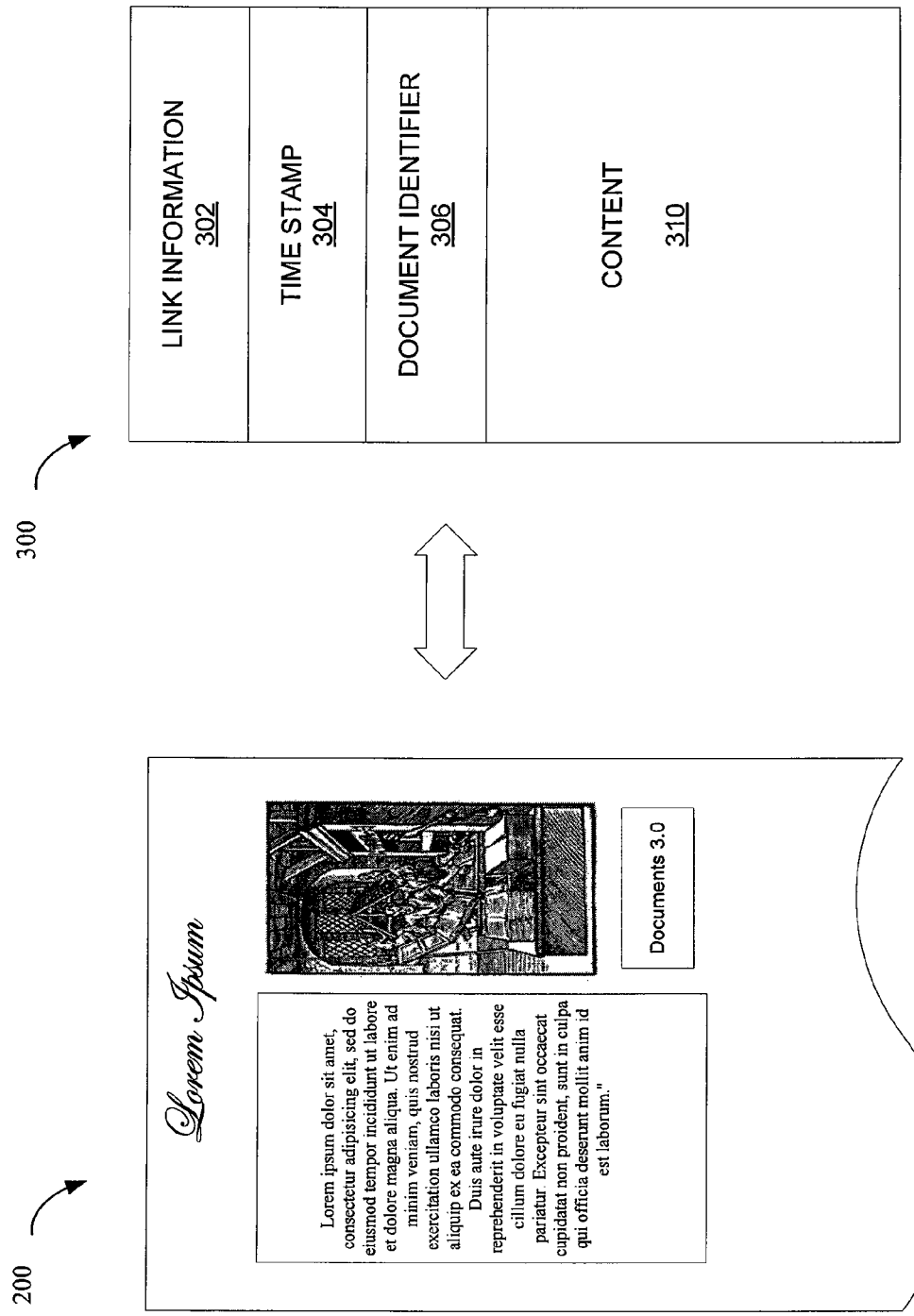
FIG. 11 is a diagram illustrating a presentation view of a document and a corresponding data file, according to one example embodiment.

FIG. 11 illustrates the composition of the data file corresponding to the page 200. The page 200 is stored as data file 300, including network server information 302, time stamp 304, document identifier 306, and content 310. Network server information may be an IP address, a host name, or link information. The network server information may be application-specific, wherein a different set of information is used by different application combinations, wherein an application combination includes the server application and the client application. Information common to multiple application combinations includes a state of the online document. The link information identifies the location of the online document, and may be a URL, IP address, or other location or access identifier. The network server maps the document dictionary information, such as link information or URL, to a unique document state.

Where a user device is acting as the server for hosting the collaborative online document, the central server may act as an agent directing each user to the current location of the collaborative online document. In this way, the actual user device acting as server may also change. This may be desirable for team projects, where a team located in one country is responsible for document processing during a first time period and a team located in another country is responsible for document processing during a second time period. Such as processing during daytime hours in the US, followed by processing during daytime hours in India. In such a situation, it may be desirable to move the document to the processing country server during processing hours.

The methods and apparatus described herein may be used for collaborative documents including word processing documents, such as textual documents, as well as other collaborative documents. Examples of collaborative documents include software programs, video data files, audio data files, multi-media data files, database compilation documents, as well as other collaborative data documents. In each example, multiple users access a document through a network, and the collaborative document is available in a connected state and a portable state. The portable state allows processing and handling apart from the network. Collaborative interactions may take place with a variety of electronic devices, including computers, hand-held devices, mobile devices, gaming devices, MP3 Players, household appliances and office equipment. The connected state document may be stored on a networked device, wherein one of the devices acts as a server. The processing may be distributed, wherein one collaborator, or user, provides edits or comments that trigger a response by another collaborator.

In one embodiment, a user application and/or the server application is a software development tool which allows the user to arrange objects using a drag-and-drop What You See is What You Get (WYSIWYG) editor. The user application and/or server application may be part of an Integrated Development Environment (IDE) or may be a stand-alone tool. The user accesses the functionality of the application(s) through representative graphical elements, which may include multiple graphical and/or audio objects in various configurations.

Figure 12:
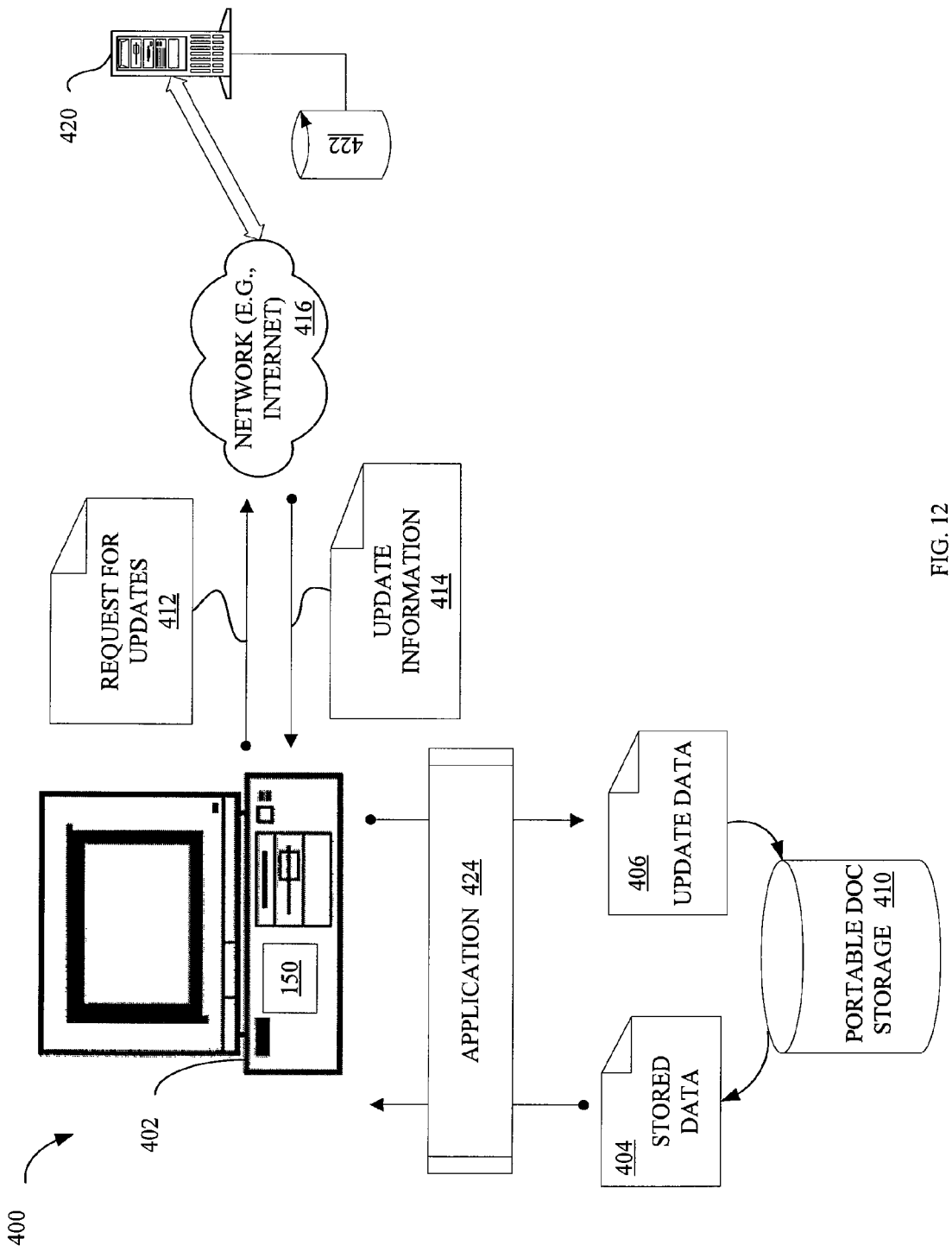
FIG. 12 is a diagram of a system for processing a collaborative document, according to an example embodiment.

FIG. 12 is a diagram of an example system 400 for processing a collaborative document, both as an online document and as a portable document. As illustrated, a user machine 402 includes user application 150, or the user application 150 may alternatively be provided external to the user machine 402, such as application 424. The user machine 402 accesses the server 420, coupled to memory storage unit 422, through a network 416, such as the Internet. The user machine 402 may be a cell phone, a computer system, a television or monitor, a PDA, a smart phone, or other device capable of accessing a network and processing documents. Requests for updates 412, and the responsive update information 414, are communicated through network 416 and formatted using an eXtensible Markup Language (XML), a Macromedia-XML (MXML), ActionScript, JavaScript, Hyper Text Markup Language (HTML), or some other suitable format.

The application 424, or the application 150, provide update data 406 to portable document storage unit 410, which provides stored data 404 as requested. The portable document information, data files and associated files and information are stored in portable document storage unit 410. This may include link information, dictionary information, revision and history information, as well as related documents and files. For example, if a portable document is part of a library of documents. The user may store multiple portable documents and an index or mapping document providing the relationship among the documents.

In some example embodiments, requests between the user machine 402 and the server 420 may be formatted as a database query using a Structured Query Language (SQL), or some other suitable format. Data and communications between the user machine 402 and the server 420 may be formatted using XML, MXML, ActionScript, HTML, or some other suitable format. In some example embodiments, the server may include a database as a native or non-native database.

Figure 13:
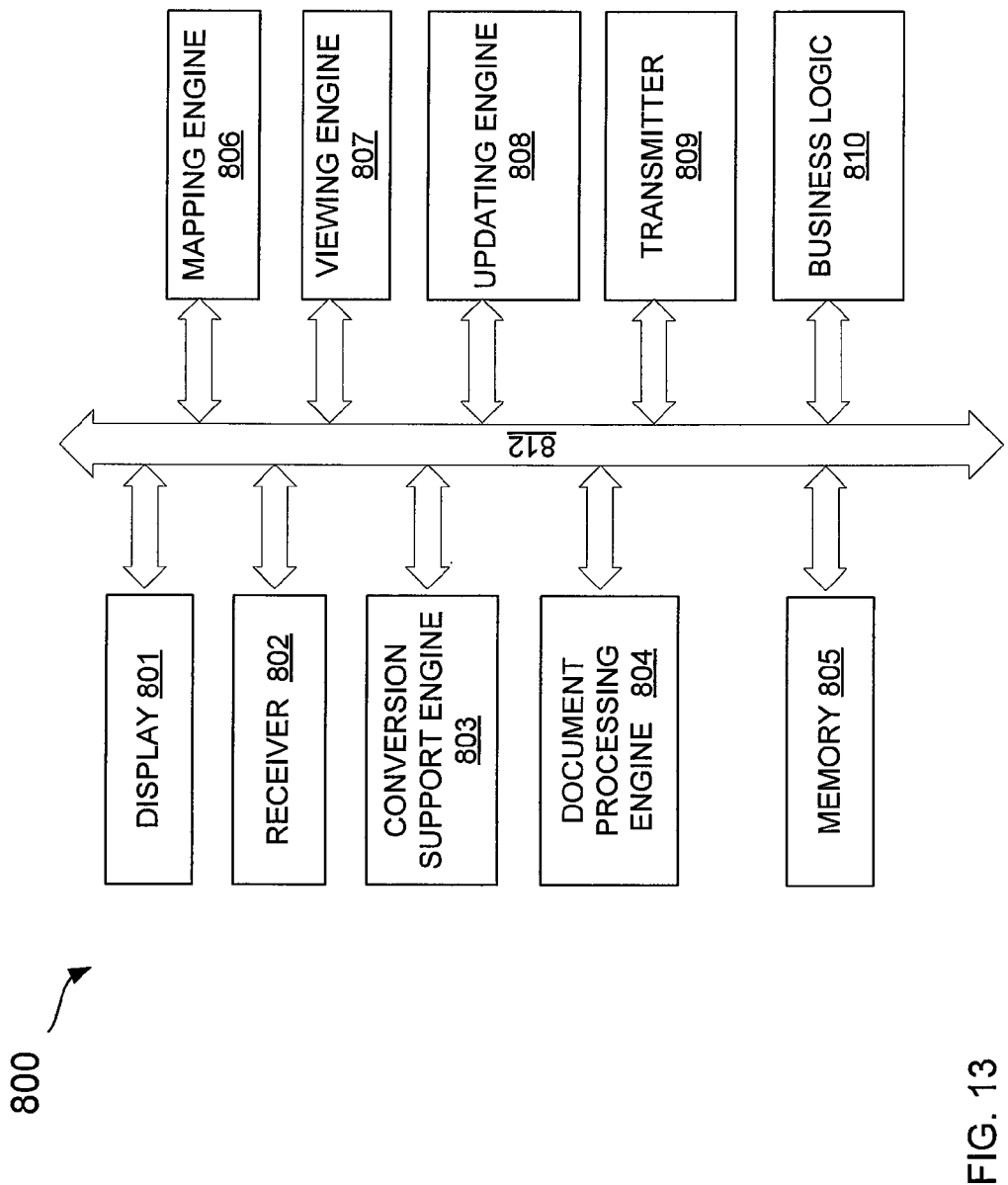
FIGS. 13 and 14 show diagrammatic representations of computer systems, according to example embodiments, that execute sets of instructions to perform any one or more of the methodologies discussed herein.

FIG. 13 is a block diagram of an example computer system 800 used to create and process documents, including collaborative online documents and portable documents, to edit and modify documents, to provide updates to documents, to merge different documents and/or different versions of documents, to store documents, to retrieve documents, to track the revision history of documents, and to associate different documents. This processing includes determining link information and dictionary information for documents, as well as other processing described herein. The blocks shown herein may be implemented in software, firmware, or hardware. These blocks may be directly or indirectly communicatively coupled via a physical or logical connection. The computer system 800 may be part of the one or more user devices illustrated in FIG. 1.

The system 800 is illustrated having various blocks 801 through 810 communicatively coupled to a communication bus 812. Illustrated is a display controller 801 to control display of a document, including a portable document view and an online document view. An input receiver 802 is adapted to receive input selections and commands from the user, wherein the input selections allow the user to specify changes to content, additions, deletions, changes to the look and feel of a document, etc. The received input may specify a request for updates to a portable document, updates to an online document, synchronization of the portable document to the online document or vice versa. The received input may specify merging of documents, or may specify user selections for updating, viewing, mapping, etc. A conversion support engine 803 serves to convert an online format document into a portable format document. Similarly, the conversion support engine 803 may also serve to convert a portable format document to an online format document. The conversion support engine 803 in one embodiment may convert the updates to one document to the other.

A document processing engine 804 provides functionality to process the online document, and to process the portable format document. Memory 805 may be used to store the content data, and any other information to be stored at the user machine. Note the memory 805 may be external to the user machine, or may be used in combination with an external memory.

Continuing with FIG. 11, further coupled to the communication bus 812 is a mapping engine 806, for developing relationships among documents. The mapping engine 806 provides information to map the portable document to the corresponding online document. The viewing engine 807 controls the views available to the user, as well as the ability to switch between views. The user may specify a maximum number of views available, the order of the views, the identification and selection of views, as well as the size of the window. In one example the viewing engine 807 allows the user to see multiple views concurrently in one window. The views may be arranged side by side or in a configuration specified by the user. In this way, the user is able to process the portable document while monitoring edits to the collaborative online document. The updating engine 808 provides the functionality for identifying updates to the online version and providing the updates to the user for application to, replacement of the portable document. In one example, the user has an option to ignore updates to the online document.

An optional transmitter 809 is used to communicate wirelessly with others in the network, including other devices as well as server 110. Business logic 810 provides workflows for processing documents, both portable and online documents.

Some example embodiments may include remote procedure calls being used to implement one or more of the above-illustrated operations or components across a distributed programming environment. For example, a logic level may reside on a first computer system that is located remotely from a second computer system including an interface level. These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

Figure 14:
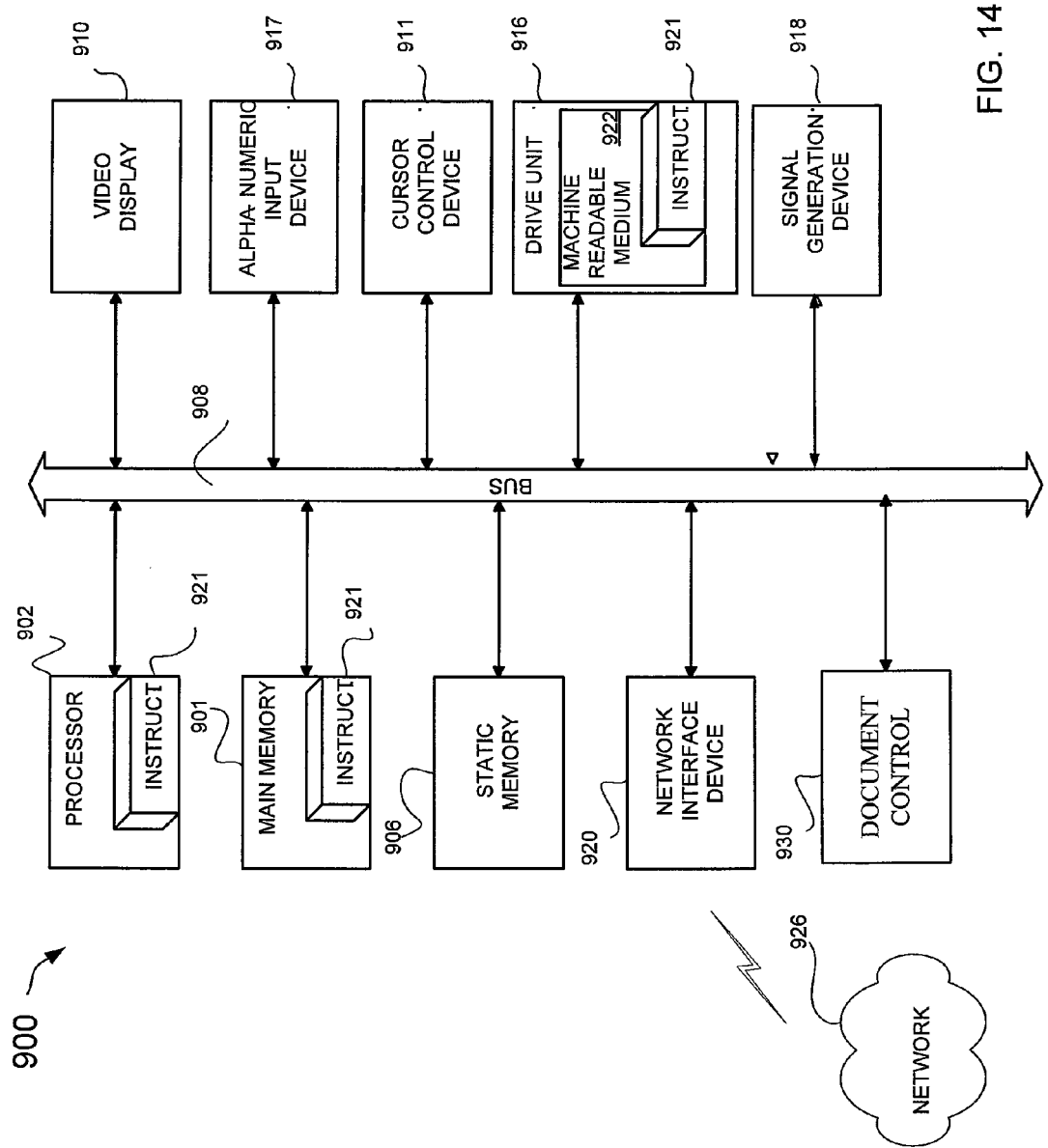

FIG. 14 shows a diagrammatic representation of a machine in the example form of a computer system 900 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 900 includes a processor 902, such as a Central Processing Unit (CPU), a main memory 901, and a static memory 906, which communicate with each other via a bus 908. The computer system 900 may further include a video display unit 910 (e.g., a Liquid Crystal Display (LCD) or a Cathode Ray Tube (CRT)). The computer system 900 also includes an alphanumeric input device 917 (e.g., a keyboard), a User Interface (UI), a cursor controller 911 (e.g., a mouse), a drive unit 916, a signal generation device 918 (e.g., a speaker) and a network interface device (e.g., a transmitter) 920.

The disk drive unit 916 includes a machine-readable medium 922 on which is stored one or more sets of instructions and data structures (e.g., software 921) embodying or used by any one or more of the methodologies or functions described herein. The software instructions 921 may also reside, completely or at least partially, within the main memory 901 and/or within the processor 902 during execution thereof by the computer system 900, the main memory 901 and the processor 902 also constituting machine-readable media.

The instructions 921 may further be transmitted or received over a network 926 via the network interface device 920 using any one of a number of well-known transfer protocols (e.g., Hyper Text Transfer Protocol (HTTP), Secure Hyper Text Transfer Protocol (HTTPS)).

A document control module 930 implements the methods and functions described herein. The document control module 930 may be implemented in software, hardware, firmware or a combination thereof. The document control module 930 may contain user application control, server application control, or a combination of at least parts of both user application control and server application control. The document control module 930 may enable the computer system 900 to acts as user, a server or a combination of both.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media. In one embodiment, techniques may be implemented by transmissions on carrier wave signals.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Embodiments may, for example, be implemented as a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

The one or more processors may also operate to support performance of the relevant operations in a "cloud computing" environment or as a "Software as a Service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

In some example embodiments, the system and method as illustrated herein may be used to validate documents, where the authentication of the content of the document and the author of the document may be required. This document may be, for example, a university transcript, birth certificate, or other suitable document.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

In the foregoing detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the foregoing detailed description are presented in terms of processes, algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A computer implemented method comprising:
   accessing, by a client device, a collaborative document stored on a server and accessed through connection to a network, the collaborative document in a first state;
   storing a copy of the collaborative document as a portable document in a second state on a non-volatile local memory device on the client device, the portable document including link information identifying a network accessible location of the collaborative document stored on the server;
   launching a client application on the client device after the storing of the copy of the collaborative document as the portable document;
   loading the portable document from the non-volatile local memory in the launched client application while disconnected from the server for viewing on the client device while disconnected from the server;
   retrieving, by the launched client application, the link information from the portable document;
   sending, from the client device to the server, a request for an updated copy of the collaborative document using the link information obtained by the retrieving; and
   updating the portable document stored on the client device according to an update to the collaborative document stored on the server using the updated copy received based on the sending of the request.

2. The computer implemented method of claim 1, wherein the portable document is editable when the client device is disconnected from the network.

3. The computer implemented method of claim 1, further comprising:
   accessing the collaborative document on the server using the link information.

4. The computer implemented method of claim 3, wherein the updating of the portable document comprises:
   merging the collaborative document, including the update, with the portable document.

5. The computer implemented method of claim 3, wherein the updating of the portable document comprises:
   replacing the portable document with the collaborative document, including the update.

6. The computer implemented method of claim 3, wherein the updating of the portable document comprises:
   applying the update to the portable document.

7. The computer implemented method of claim 3, wherein the updating of the portable document according to the update to the collaborative document comprises comparing a time stamp of the collaborative document with a time stamp of the portable document.

8. The computer implemented method of claim 3, wherein the updating of the portable document according to the update to the collaborative document comprises comparing a version number of the collaborative document with a version number of the portable document.

9. The computer implemented method of claim 1, further comprising:
   using the link information to request a current version of the collaborative document; and
   presenting an option to a user at the client device to merge the current version of the collaborative document into the portable document.

10. The computer implemented method of claim 1, wherein the link information is a Uniform Resource Locator for the collaborative document on the server.

11. The computer implemented method of claim 1, further comprising:
   receiving an alert indicating the modification to the collaborative document.

12. The computer implemented method of claim 11, further comprising: updating the portable document to reflect the modification to the collaborative document.

13. The computer implemented method of claim 12, wherein updating the portable document to reflect the modification to the collaborative document is done automatically in response to the modification to the collaborative document.

14. The computer implemented method of claim 13, further comprising:
   periodically checking for modifications to the collaborative document.

15. A computer implemented method comprising:
   instructing, using a client application on a client device, a collaborative word processor to perform edits on a collaborative document in an online state stored on a server and accessed through connection to a network, the collaborative word processor being server-based;
   converting, using the client application, the collaborative document in the online state into a portable document in a portable state stored on the client device, the portable document having associated link information identifying a network accessible location of the collaborative document stored on the server;
   launching the client application on the client device after the portable document is stored on the client device in non-volatile memory;
   loading from the non-volatile memory the portable document stored on the client device in the launched client application while disconnected from the server for viewing for viewing in the client application on the client device while disconnected from the server;
   retrieving, by the launched client application, the link information from within the portable document;
   sending, to the server from the client device, a request for a current version of the collaborative document using the link information obtained by the retrieving;
   receiving, by the client device, the current version of the collaborative document from the server based on the sending of the request; and
   accessing, by the client device, the collaborative document on the server using the link information and the current version.

16. The computer-implemented method of claim 15, wherein the collaborative document is a web-based collaboration accessible to multiple users.

17. The computer-implemented method of claim 15, further comprising:
   identifying the link information in dictionary data corresponding to the portable document.

18. The computer-implemented method of claim 15, further comprising:
   determining that there is an update to the collaborative document;
   requesting the update to the collaborative document; and
   applying the update to the portable document.

19. The computer-implemented method of claim 15, further comprising:
   modifying the portable document to generate modifications for the portable document; and
   providing the modifications for the portable document to the collaborative document.

20. The computer-implemented method of claim 15, further comprising:
   disconnecting from the network; and
   modifying the portable document while disconnected from the network.

21. The computer-implemented method of claim 20, further comprising:
   receiving an alert indicating a modification to the collaborative document, the alert generated by the server; and
   in response to the alert, accessing a current version of the collaborative document.

22. The computer implemented method of claim 15, further comprising: receiving an alert indicating modification to the collaborative document.

23. The computer implemented method of claim 22, further comprising:
   updating the portable document to reflect the modification to the collaborative document.

24. A computer system, comprising:
   a plurality of modules, each module comprising instructions retained on at least one machine-readable storage medium, and that when executed by a machine perform identified operations, wherein the modules comprise:
   a document processing engine, adapted to process a portable document corresponding to a collaborative document, the collaborative document being resident on a server accessible through a distributed network, the portable document being editable when disconnected from the network, the portable document including link information associated with a network accessible location of the collaborative document being resident on the server;
   a non-volatile local memory on a client device, adapted to provide the portable document to the document processing engine for the processing;
   the client device, adapted to launch a client application on the client device after the portable document is stored in the non-volatile memory, the client application configured to perform loading of the portable document from the non-volatile local memory in the launched client application for viewing on the client device, and and retrieving of the link information from the loaded portable document; and
   an updating engine adapted to send a request for updates of the collaborative document using the link information obtained by the retrieving and apply the updates of the collaborative document to the portable document using the updates received based on the request.

25. The computer system as in claim 24, further comprising:
   a viewing engine, adapted to display the collaborative document and the portable document when connected to the network, and adapted to display the portable document when disconnected from the network.

26. The computer system as in claim 25, wherein the viewing engine is further adapted to switch between the collaborative document view and the portable document view by user selection.

27. The computer system of claim 24, wherein in response to receiving an alert indicating modification to the collaborative document, the updating engine updates the portable document to reflect the modification to the collaborative document.

28. A non-transitory machine-readable storage medium comprising instructions, which when implemented by one or more machines, cause the one or more machines to perform the following operations:

accessing a collaborative document stored on a server and accessed through connection to a network;

storing a copy of the collaborative document as a portable document on a non-volatile local memory device on a client device, the portable document editable when disconnected from the network, the portable document including link information identifying a network accessible location of the collaborative document stored on the server;

launching a client application on the client device after the storing of the copy of the collaborative document as the portable document;

loading the portable document stored on the non-volatile local memory device in the launched client application for viewing on the client device;

receiving a notice of a change to the collaborative document;

retrieving, by the launched client application, the link information from the portable document;

in response to the notice of the change, accessing the change to the collaborative document on the server using the link information obtained by the retrieving; and applying the change obtained by the accessing to the portable document.

29. The non-transitory machine-readable storage medium of claim 28, which when implemented by one or more machines, cause the one or more machines to perform further operations:

receiving an alert indicating modification to the collaborative document;

and updating the portable document to reflect the modification to the collaborative document.

30. A method comprising:

using a computing system including one or more machines, to perform one or more of the following acts:

executing instructions on a specific apparatus to access digital electronic signals representing a collaborative document stored on a server and accessed through connection to a network, the collaborative document in a first state;

executing instructions on a specific apparatus to store digital electronic signals as a copy of the collaborative document being a portable document in a second state on a non-volatile local memory device of a client device, the portable document including link information identifying a network accessible location of the collaborative document stored on the server;

launching a client application on the client device after the copy of the collaborative document is stored as the portable document in the non-volatile local memory device;

loading the portable document from the non-volatile local memory device in the launched client application for viewing on the client device;

retrieving, by the launched client application, the link information from the loaded portable document;

executing instructions on a specific apparatus to request an update to the collaborative document using the link information obtained by the retrieving; and executing instructions on a specific apparatus to update the digital electronic signals representing the portable document according to the update to the collaborative document using the update to the collaborative document received based on the request.

31. The method of claim 30, further for performing one or more of the following acts:

executing instructions on a specific apparatus to receive an alert indicating modification to the collaborative document; and executing instructions on a specific apparatus to update the digital electronic signals representing the portable document to reflect the modification to the collaborative document.

* * * * *